United States Patent
Ootsuka et al.

(10) Patent No.: US 10,837,441 B2
(45) Date of Patent: Nov. 17, 2020

(54) RECIPROCATING COMPRESSOR

(71) Applicant: Kobe Steel, Ltd., Hyogo (JP)

(72) Inventors: Tomohiro Ootsuka, Takasago (JP); Ryosuke Yamasaki, Takasago (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 16/245,910

(22) Filed: Jan. 11, 2019

(65) Prior Publication Data
US 2019/0234402 A1    Aug. 1, 2019

(30) Foreign Application Priority Data

Jan. 31, 2018 (JP) .................. 2018-015129

(51) Int. Cl.
| | |
|---|---|
| *F04B 53/14* | (2006.01) |
| *F04B 39/00* | (2006.01) |
| *F04B 39/12* | (2006.01) |
| *F16J 15/16* | (2006.01) |
| *F16J 15/56* | (2006.01) |

(52) U.S. Cl.
CPC ........ *F04B 53/143* (2013.01); *F04B 39/0005* (2013.01); *F04B 39/0022* (2013.01); *F04B 39/121* (2013.01); *F04B 39/122* (2013.01); *F04B 53/146* (2013.01); *F16J 15/164* (2013.01); *F16J 15/56* (2013.01); *F05D 2240/55* (2013.01)

(58) Field of Classification Search
CPC .. F04B 53/143; F04B 39/0005; F04B 39/121; F04B 39/0022; F04B 39/122; F04B 39/00; F04B 39/06; F16J 15/164; F16J 15/56; F05D 2240/55

See application file for complete search history.

(56) References Cited

U.S. PATENT DOCUMENTS

| | | | | |
|---|---|---|---|---|
| 3,282,218 A | * | 11/1966 | Bauers .................. | F04B 5/02 417/319 |
| 3,481,255 A | * | 12/1969 | Friedenreich .......... | F04B 37/12 92/258 |

(Continued)

FOREIGN PATENT DOCUMENTS

| | | | |
|---|---|---|---|
| CN | 1766330 A | * | 5/2006 |
| CN | 203742940 U | * | 7/2014 |

(Continued)

*Primary Examiner* — Thomas E Lazo
(74) *Attorney, Agent, or Firm* — Studebaker & Brackett PC (57) ABSTRACT

This application discloses a reciprocating compressor including: a piston rod extending along a predetermined central axis that crosses an opening formed in an end of a cylinder, the piston rod being coupled to a piston and a crank mechanism to convey driving force from the crank mechanism to the piston; a rear head penetrated by the piston rod, the rear head closing the opening of the cylinder; and a rod ring portion configured to prevent a gas in the cylinder from leaking out from a gap between the rear head and the piston rod. The piston rod includes an outer circumferential surface on which an annular groove portion surrounding the central axis of the piston rod is formed. The rod ring portion includes an inner circumferential portion inserted into the groove portion, and an outer circumferential portion in sliding contact with an inner circumferential surface of the rear head.

7 Claims, 4 Drawing Sheets

(56) References Cited

U.S. PATENT DOCUMENTS

| | | | | |
|---|---|---|---|---|
| 4,173,433 A | * | 11/1979 | Anderson | F04B 39/0005 |
| | | | | 417/254 |
| 6,318,147 B1 | | 11/2001 | Steinruck et al. | |
| 9,869,312 B2 | * | 1/2018 | Hoff | F04B 53/144 |
| 2008/0191427 A1 | * | 8/2008 | Tran | F16J 15/164 |
| | | | | 277/630 |
| 2019/0309853 A1 | * | 10/2019 | Lenhert | F16J 15/3236 |

FOREIGN PATENT DOCUMENTS

| | | | | |
|---|---|---|---|---|
| CN | 204984782 U | * | 1/2016 | |
| DE | 102004011410 A1 | * | 9/2005 | F16J 15/56 |
| JP | 2015-040519 A | | 3/2015 | |
| JP | 2016153637 A | * | 8/2016 | F04B 39/121 |

* cited by examiner

RECIPROCATING COMPRESSOR

TECHNICAL FIELD

The present invention relates to a reciprocating compressor configured to compress gas.

BACKGROUND ART

A reciprocating compressor (hereinafter referred to as "compressor") reciprocates a piston in a cylinder to compress gas in the cylinder. A piston rod, which transmits a rotational force of a crankshaft to the piston as a force of causing the reciprocation of the piston, extends through a rear head which closes an opening formed in a lower end of the cylinder. Generally, gas leakage through a boundary space between the piston rod and the rear head is prevented by an annular rod packing (c.f. JP 2000-65693 A and JP 2015-40519 A). The rod packing is formed so that an inner circumferential portion of the rod packing is pushed against an outer circumferential surface of the piston rod. Since the inner circumferential portion of the rod packing is in pressure contact with the outer circumferential surface of the piston rod, the gas in the cylinder is prevented from leakage through the boundary between the inner circumferential portion of the rod packing and the outer circumferential surface of the piston rod.

A small gap may be formed between the inner circumferential portion of the rod packing and the outer circumferential surface of the piston rod. In this case, the gas enters the small gap between the inner circumferential portion of the rod packing and the outer circumferential surface of the piston rod, and pushes out the rod packing. If there is a high pressure of the gas in the cylinder, the force pushing out the rod packing may become strong so that the inner circumferential portion of the rod packing may become slightly distant from the outer circumferential surface of the piston rod. In this case, the high-pressure gas in the cylinder may leak from an internal space of the cylinder to an adjacent space separated by the rear head through the small gap formed between the inner circumferential portion of the rod packing and the outer circumferential surface of the piston rod.

If many rod packings are arranged along the piston rod, there is a decreased risk of the gas leakage from the cylinder. In this case, the compressor is likely to become large in an extension direction of the piston rod since it is necessary to form an area for arranging the many rod packings in the compressor.

SUMMARY OF INVENTION

An object of the present invention is provide a small reciprocating compressor which has a structure to reduce a risk of gas leakage through a boundary between a piston rod and a rear head.

A reciprocating compressor according to one aspect of the present invention includes a crank mechanism which generates a driving force for reciprocating a piston in a cylinder so that gas flowing into the cylinder is compressed by using the piston reciprocating in the cylinder. The reciprocating compressor includes a piston rod extending along a predetermined central axis across an opening formed in an end of the cylinder, the piston rod being coupled to the piston and the crank mechanism to transmit the driving force from the crank mechanism to the piston; a rear head through which the piston rod extends, the rear head being configured to close the opening of the cylinder; and a rod ring portion configured to prevent the gas in the cylinder from leaking from a gap between the rear head and the piston rod. The piston rod includes an outer circumferential surface on which an annular groove portion is formed to surround the central axis of the piston rod. The rod ring portion includes an inner circumferential portion which is fit into the groove portion; and an outer circumferential portion in sliding contact with an inner circumferential surface of the rear head while the piston rod reciprocates in an extension direction of the central axis together with the piston.

The aforementioned technique enables a designer to design a small reciprocating compressor having a structure to reduce a risk of gas leakage through a boundary between a piston rod and a rear head.

The object, feature, and advantage of the aforementioned reciprocating compressor will be more apparent from the following detailed description and the accompanying drawings.

DESCRIPTION OF EMBODIMENTS

First Embodiment

Figure 1:
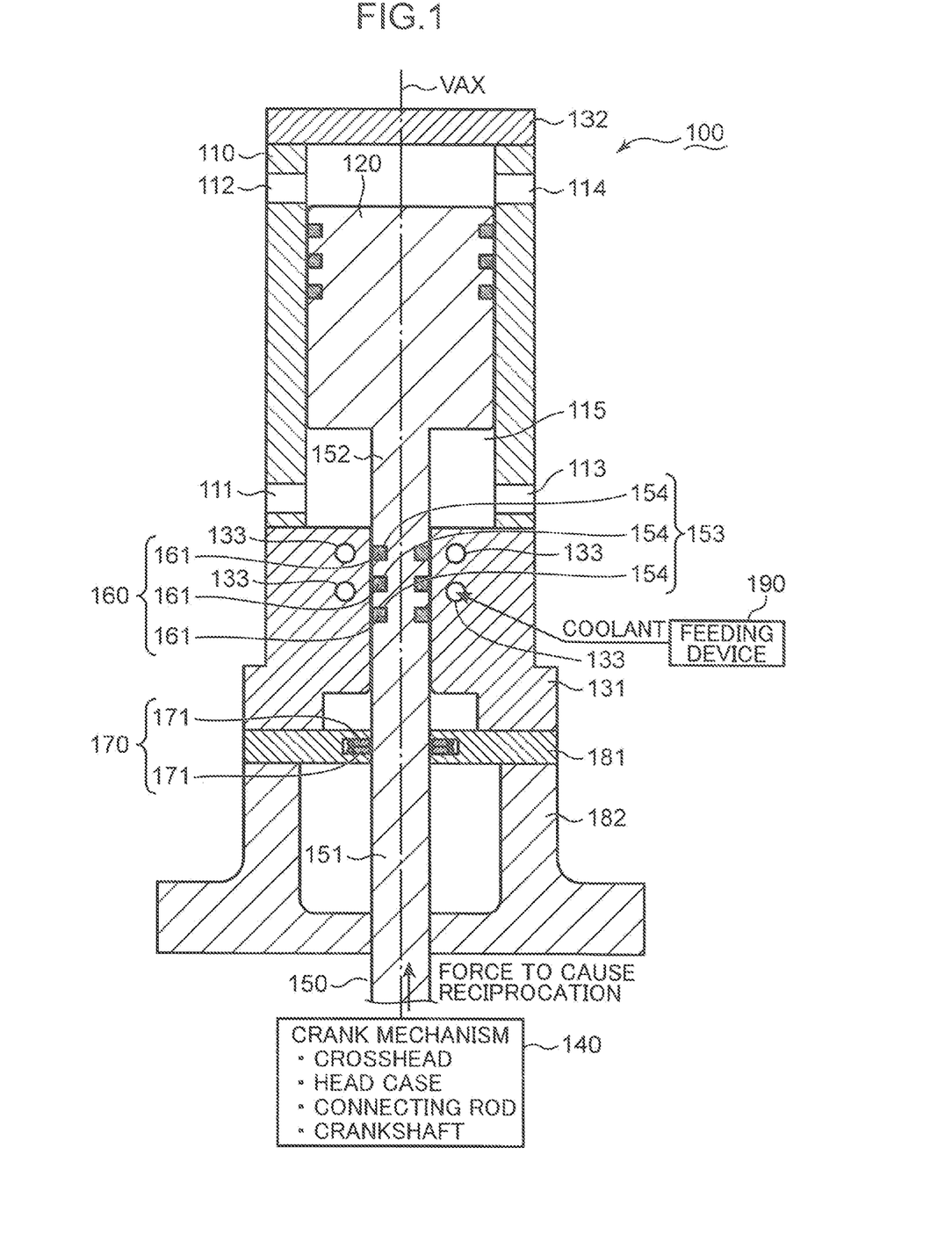
FIG. 1 is a schematic sectional view of a reciprocating compressor of the first embodiment.

FIG. 1 is a schematic sectional view of a reciprocating compressor of the first embodiment (hereinafter referred to as "compressor 100"). The compressor 100 is described with reference to FIG. 1.

The compressor 100 is coupled to a suction flow path (not shown) in which a gas flows to be subjected to a compression process, and compresses the gas flowing into the compressor 100. The compressor 100 then discharges the gas after the compression process to a discharge flow path, which is coupled to an accumulator configured to accumulate the compressed gas or a predetermined device that uses the compressed gas.

FIG. 1 shows a cylinder HO as a part of the compressor 100. In addition, FIG. 1 shows a vertical axis line VAX extending in the vertical direction. The cylinder 110 is a generally cylindrical part of which central axis is substantially coincident with the vertical axis line VAX. The vertical axis line VAX is a virtual straight line orthogonal to openings formed in ends of the cylinder 110 (upper and lower ends). Suction ports 111, 112 coupled to the suction flow path and discharge ports 113, 114 coupled to the discharge flow path are formed in the cylinder 110. The internal space of the cylinder 110 is used for compressing the gas which has entered through the suction ports 111, 112.

FIG. 1 further shows a piston 120 and two rear heads 131, 132 as a part of the compressor 100. The cylinder 110, the piston 120 and the rear heads 131, 132 form a space to confine the gas entering the cylinder 110 through the suction ports 111, 112. The piston 120 reciprocates in the space to compress the gas which is confined in the space. The compressed gas is discharged to the discharge flow path through the discharge ports 113, 114.

The piston 120 is a columnar part situated in the cylinder 110, the central axis of the piston 120 being substantially coincident with the vertical axis line VAX. The piston 120 reciprocates in an extension direction of the vertical axis line VAX in the cylinder 110. The rear head 131 closes the opening formed in the lower end of the cylinder 110. The rear head 132 closes the opening in the upper end of the cylinder 110. Therefore, the cylinder 110 and the rear heads 131, 132 form a closed space except for the suction ports 111, 112 and the discharge ports 113, 114. As shown in FIG. 1, a variable capacity space 115 surrounded by the inner circumferential surface of the cylinder 110, the lower surface of the piston 120, and the upper surface of the rear head 131 is formed in the cylinder 110. The suction port 111 and the discharge port 113 communicate with the variable capacity space 115. The gas flows into the variable capacity space 115 through the suction port 111. The piston 120 moves downward from the position shown in FIG. 1 to contract the variable capacity space 115, so that the piston 120 compresses the gas in the variable capacity space 115. The compressed gas is discharged through the discharge port 113 to the discharge flow path. With regard to the present embodiment, the variable capacity space 115 is used as a compression chamber for compressing the gas.

FIG. 1 further shows a crank mechanism 140 and a piston rod 150 as a part of the compressor 100. The crank mechanism 140 generates a driving force for reciprocating the piston 120 in the cylinder 110. The piston rod 150 transmits the driving force generated by the crank mechanism 140 to the piston 120.

The crank mechanism 140 is situated below the piston 120. The crank mechanism 140 includes a crankshaft, a connecting rod, a crosshead and a cylindrical head case. The crankshaft rotates around the rotation axis orthogonal to the vertical axis line VAX. The connecting rod is coupled to the crankshaft and the crosshead situated in the head case. The crosshead is a cylindrical body of which central axis is substantially coincident with the vertical axis line VAX. The head case allows only displacement of the crosshead in a direction along the vertical axis line VAX whereas the head case does not allow displacement of the crosshead in the horizontal direction. While the crankshaft rotates, the connecting rod changes its posture so as to absorb the horizontal displacement component of the crankshaft. Therefore, rotational movement of the crankshaft is converted into reciprocation of the crosshead by the connecting rod, the crosshead and die head case. The piston rod 150 extends downward from the lower surface of the piston 120, and is coupled to the upper surface of the crosshead. Therefore, the reciprocation of the crosshead is transmitted to the piston 120 through the piston rod 150. Accordingly, the piston 120 may reciprocate along the vertical axis line VAX as described above.

The central axis of the piston rod 150 is generally coincident with the vertical axis line VAX. A through hole along the vertical axis line VAX is formed in the rear head 131 which closes the opening in the lower end of the cylinder 110. The piston rod 150 extending along the vertical axis line VAX orthogonal to the opening in the lower end of the cylinder 110 is inserted into the through hole of the rear head 131, and is coupled to the crosshead of the crank mechanism 140 and the piston 120.

As a result of the insertion of the piston rod 150 into the through hole of the rear head 131, an annular boundary is formed between the outer circumferential surface of the piston rod 150 and the inner circumferential surface of the rear head 131. When the crankshaft of the crank mechanism 140 is at the top dead center, the piston 120 reaches the position shown in FIG. 1. When the crankshaft subsequently moves from the top dead center to the bottom dead center, the piston 120 is displaced downward toward the rear head 131. Since the variable capacity space 115 becomes smaller at this time, the gas in the variable capacity space 115 is compressed. Accordingly, a part of the gas in the variable capacity space 115 is pushed out to the thin annular gap formed at the boundary between the outer and inner circumferential surfaces of the piston rod 150 and the rear head 131. With regard to a conventional reciprocating compressor, an annular rod packing is used in order to keep the gas which is about to flow out through the gap at the boundary between the outer and inner circumferential surfaces of the piston rod 150 and the rear head 131.

If the conventional rod packing is used in a structure of the compressor 100, the outer circumferential portion of the rod packing is fixed to the inner circumferential surface of the rear head 131 whereas the inner circumferential portion of the rod packing is in pressure contact with the outer circumferential surface of the piston rod 150. In short, the rod packing is not relatively displaced with respect to the rear head 131 during the reciprocation of the piston rod 150 together with the piston 120 whereas the rod packing is relatively displaced with respect to the piston rod 150 and is in sliding contact with the outer circumferential surface of the piston rod 150.

<Problem of Rod Packing>

Figure 2:
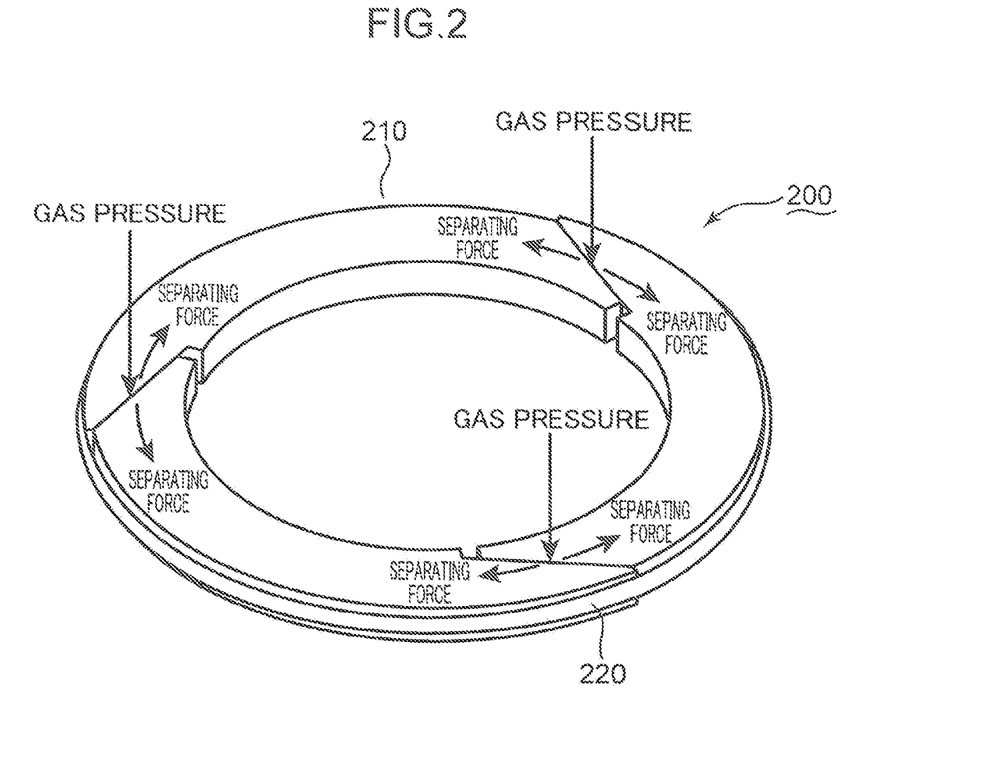
FIG. 2 is a schematic perspective view of a general rod packing.

FIG. 2 is a schematic perspective view of a general rod packing 200. A problem of the rod packing 200 is described with reference to FIG. 2.

The rod packing 200 includes a packing ring 210 and a coil spring 220. The coil spring 220 extends along the outer circumferential edge of the packing ring 210 over the entire outer circumference of the packing ring 210. The coil spring 220 gives the packing ring 210 a force which deforms the packing ring 210 so as to reduce an inner diameter of the packing ring 210. Therefore, the inner circumferential portion of the packing ring 210 is in pressure contact with the outer circumferential surface of the piston rod when the piston rod is inserted into the rod packing 200. However, it may happen because of manufacturing inaccuracy of the packing ring 210 or other causes that the inner circumferential portion of the packing ring 210 becomes distant from the outer circumferential surface of the piston rod, which results in the gas flowing into the gap between the inner circumferential portion of the packing ring 210 and the outer circumferential surface of the piston rod. Once the gas flows into the boundary between the inner circumferential portion of the packing ring 210 and the outer circumferential surface of the piston rod, the gas acts to push out the inner circumferential portion of the packing ring 210. Accordingly, the gap between the inner circumferential portion of the packing ring 210 and the outer circumferential surface of the piston rod becomes increasingly large to further increase the gas leakage quantity. Therefore, sealing techniques using the conventional rod packing are unsuitable for the reciprocating compressor configured to generate high-pressure gas.

In order to reduce a risk of the gas leakage, many rod packings may be arranged along the piston rod in the reciprocating compressor. In this case, it is necessary to form a space for the arrangement of the many rod packings in the reciprocating compressor. Accordingly, the reciprocating compressor becomes large in the extension direction of the piston rod.

<Reciprocating Compressor with Rod Ring Portion>

As shown in FIG. 1, the compressor 100 includes a rod ring portion 160 which shows high sealing performance even under a high pressure of the gas to prevent the high-pressure gas in the variable capacity space 115 from leaking from the gap between the outer circumferential surface of the piston rod 150 and the inner circumferential surface of the rear head 131. FIG. 1 shows three rod rings 161 as the rod ring portion 160. However, the rod ring portion 160 may be less or more than three rod rings 161.

Each of the three rod rings 161 is a curved thin ring member to which a bias force works to enlarge a diameter of the rod ring 161.

The piston rod 150 includes a first rod portion 151 and a second rod portion 152. The first rod portion 151 extends upward from the crosshead of the crank mechanism 140. The second rod portion 152 is a part in which a groove portion 153 is formed to fix the rod ring portion 160 to the piston rod 150, and is situated on the first rod portion 151. In short, the second rod portion 152 extends along the vertical axis line VAX between the first rod portion 151 and the piston 120. Since the second rod portion 152 has the same diameter as the first rod portion 151, the piston rod 150 may be easily manufactured.

FIG. 1 shows three annular grooves 154 recessed on the outer circumferential surface of the second rod portion 152 as the groove portion 153. Each of the three annular grooves 154 is formed to surround the vertical axis line VAX. The three rod rings 161 are fit into the three annular grooves 154. The three annular grooves 154 are formed at regular intervals in the extension direction of the vertical axis line VAX. Therefore, the three rod rings 161 fit into the three annular grooves 154 are arranged at regular intervals in the extension direction of the vertical axis line VAX. The intervals of the three annular grooves 154 (i.e. the intervals of the three rod rings 161) may be determined on the basis of a mechanical strength of the piston rod 150.

Since the inner circumferential portions of the three rod rings 161 are fit into the three annular grooves 154 formed on the piston rod 150, the three rod rings 161 reciprocate together with the piston rod 150 while the piston rod 150 reciprocates along the vertical axis line VAX. In short, the three rod rings 161 are not relatively displaced with respect to the piston rod 150. On the other hand, the three rod rings 161 are relatively displaced with respect to the rear head 131 while the piston rod 150 reciprocates along the vertical axis line VAX together with the piston 120.

The outer circumferential portion of each of the three rod rings 161 is situated outside the outer circumferential surface of the second rod portion 152 in the radial direction of the second rod portion 152. The outer circumferential portion of each of the three rod rings 161 is in pressure contact with the inner circumferential surface of the rear head 131. The outer circumferential portion of each of the three rod rings 161 is in sliding contact with the inner circumferential surface of the rear head 131 while the piston rod 150 reciprocates along the vertical axis line VAX together with the piston 120.

Figure 3:
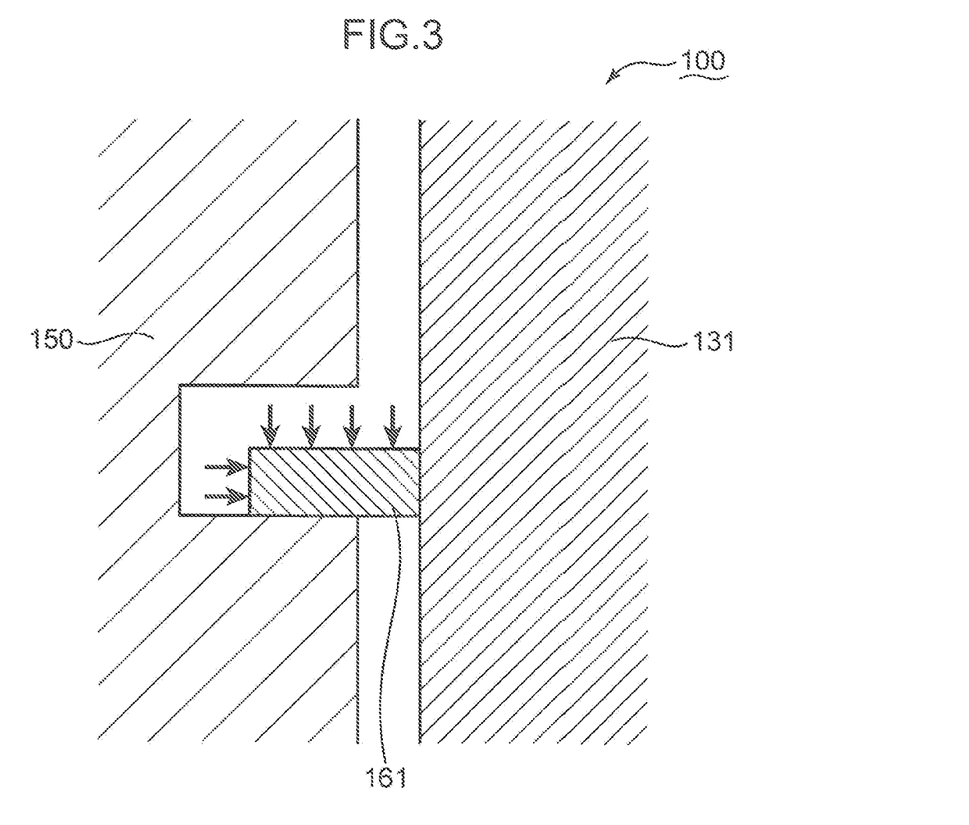
FIG. 3 is a schematic enlarged sectional view of the reciprocating compressor around a rod ring.

FIG. 3 is a schematic enlarged sectional view of the compressor 100 around the rod ring 161. FIG. 3 schematically shows the rod ring 161 and the piston rod 150 to describe how a force is applied to the rod ring 161. The rod ring 161 is described with reference to FIGS. 1 to 3.

Unlike the rod packing 200 which shows the inward bias force with the coil spring 220, the rod ring 161 is formed to cause an outward bias force. Therefore, when the rod ring 161 is attached to the piston rod 150, the outer circumferential portion of the rod ring 161 is pushed with a strong force against the rear head 131 surrounding the rod ring 161.

The contact force between the wall surface of the piston rod 150, on which the annular grooves 154 are formed, and the surface of the rod ring 161 is weaker than a contact pressure between the outer circumferential portion of the rod ring 161 and the inner circumferential surface of the rear head 131. Therefore, the high-pressure gas enters the boundary between the wall surface of the piston rod 150 and the surface of the rod ring 161 more easily than the boundary between the outer circumferential portion of the rod ring 161 and the inner circumferential surface of the rear head 131. Accordingly, a high pressure of the gas acts outward on the inner circumferential portion of the rod ring 161 as shown in FIG. 3. The outward force acting on the inner circumferential portion of the rod ring 161 increases the outer diameter of the rod ring 161. When the rod ring 161 deforms so that the outer diameter of the rod ring 161 increases, the outer circumferential portion of the rod ring 161 is pushed by a stronger force against the rear head 131 surrounding the rod ring 161.

Contrary to the rod packing 200 in which the gas pressure acts to weaken a contact pressure on a sealing target (i.e. piston rod), the gas pressure strengthens a contact pressure of the rod ring 161 on a sealing target (i.e. rear head 131). Accordingly, the compressor 100 including the rod ring portion 160 may maintain excellent sealing performance even while the compressor 100 generates the high-pressure gas.

(Reciprocating Compressor with Additional Rod Packing)

In order to prevent lateral deviation of the piston rod 150 (curve in a direction deviated from the vertical axis line VAX), the inner circumferential surface of the rear head 131 is close to the outer circumferential surface of the piston rod 150 over a predetermined section in the extension direction of the vertical axis line VAX. The rod rings 161 are arranged in the extension direction of the vertical axis line VAX within the section along which the inner circumferential surface of the rear head 131 is close to the outer circumferential surface of the piston rod 150. A section length to arrange the rod rings 161 is determined in consideration of a stroke length of the piston 120 and a length of the section along which the inner circumferential surface of the rear head 131 is close to the outer circumferential surface of the piston rod 150. It may be determined in consideration of a mechanical strength of the piston rod 150 how many rod rings 161 are arranged in the determined section length.

It is required to form a sliding surface on an inner circumferential surface side of the rear head 131 because the rod rings 161 are attached to the piston rod 150. If many rod rings 161 are mounted on the piston rod 150, there is an increased axial length of the sliding surface, which results in an enlarged structure of the compressor 100. Therefore, rod packings 171 arranged along the vertical axis line VAX (FIG. 1 shows two rod packings 171) or a rod packing portion 170 including one rod packing 171 which is substantially coaxial to the vertical axis line VAX may be provided additionally, as shown in FIG. 1. Since the rod packings 171 are in sliding contact with the outer circumferential surface of the piston rod 150, it is not necessary to additionally provide a sliding surface in the rear head 131 unlike the rod rings 161, so that the compressor 100 is prevented from becoming large. Thus, the rod packings 171 may be selected additionally in terms of the two viewpoints of required sealing performance and prevention of enlarging the compressor because of arrangement of too many rod rings 161.

Each of the two rod packings 171 shown in FIG. 1 may have the same structure as the structure of the rod packing 200 described with reference to FIG. 2. Therefore, the description about the rod packing 200 is applicable to the two rod packings 171.

The rod packing portion 170 is arranged below the second rod portion 152 to which the rod ring portion 160 is attached. The rod packing portion 170 is situated between the second rod portion 152 and the crank mechanism 140. The first rod portion 151 extends downward from the second rod portion 152 to the crank mechanism 140 and extends through the rod packing portion 170. Therefore, the inner circumferential edge of each of the two rod packings 171 is in sliding contact with the outer circumferential surface of the first rod portion 151 while the piston rod 150 reciprocates along the vertical axis line VAX together with the piston 120.

Since the rod ring portion 160 has high sealing performance as described above, there is a small amount of gas flowing into the gap formed between the first rod portion 151 and the rear head 131. Therefore, the rod packing portion 170 is not exposed to excessively high gas pressure. Accordingly, the drawback of the rod packing 200 described with reference to FIG. 2 may be negligible.

Since an excessively high gas pressure does not happen to the gap formed between the first rod portion 151 and the rear head 131, sealing performance which is required of the rod packing portion 170 is not as high as sealing performance which is required of the rod ring portion 160. Therefore, the rod packings 171 used as the rod packing portion 170 may be fewer than the rod rings 161 used as the rod ring portion 160 (with regard to the present embodiment, the two rod packings 171 are used as the rod packing portion 170 whereas the three rod rings 161 are used as the rod ring portion 160).

As shown in FIG. 1, the compressor 100 includes a retainer board portion 181 and an adapter pipe 182. The retainer board portion 181 is situated between the adapter pipe 182 and the rear head 131. The rod packing portion 170 is retained by the retainer board portion 181. The retainer board portion 181 separates the gap formed between the inner and outer circumferential surfaces of the rear head 131 and the first rod portion 151 from a space surrounded by the adapter pipe 182. The rod packing portion 170 retained by the retainer board portion 181 prevents the gas from leaking from the gap formed between the inner and outer circumferential surfaces of the rear head 131 and the first rod portion 151 to the space surrounded by the adapter pipe 182 although the gas passing through the rod ring portion 160 flows into the gap formed between the inner and outer circumferential surfaces of the rear head 131 and the first rod portion 151. This reduces a risk of the gas leakage to the space surrounded by the adapter pipe 182. The adapter pipe 182 is fixed to the rear head 131 via the retainer board portion 181. When wear or damage happens to the rod packing portion 170 and the rod ring portion 160, the gas may flow into the space surrounded by the adapter pipe 182 and the retainer board portion 181. A pipe member (not shown) for feeding a nonflammable purge gas (e.g. nitrogen gas) into the internal space of the adapter pipe 182 and a pipe member (not shown) for discharging the gas and the purge gas inside the adapter pipe 182 are attached to the adapter pipe 182, the purge gas being used for discharge of the gas leaking into the adapter pipe 182. Since the pipe member attached to the adapter pipe 182 allows the discharge of the gas and the purge gas that have leaked beyond the rod packing portion 170, most of the leaking gas and the purge gas inside the adapter pipe 182 is discharged from the compressor 100 through the pipe member attached to the adapter pipe 182. Accordingly, there is a low risk of inflow of the leaking gas and the purge gas into the head case. Therefore, even if the leaking gas is flammable, the crank mechanism 140 may operate safely.

The rod packing portion 170 attached to the retainer board portion 181 does not move relatively with respect to the retainer board portion 181. On the other hand, the rod packing portion 170 is relatively movable with respect to the piston rod 150. Therefore, unlike the rod ring portion 160, a designer may arrange the rod packing portion 170 in the retainer board portion 181 without taking the stroke length into consideration.

The designer may determine how many rod rings 161 are used as the rod ring portion 160 and how many rod packings 171 are used as the rod packing portion 170 in consideration of a stroke length of the piston rod 150, a length of the rear head 131 in the extension direction of the vertical axis line VAX, and a thickness of the retainer board portion 181. For example, the designer may determine how many rod rings 161 and rod packings 171 are arranged, so that the compressor 100 is shortened in the extension direction of the vertical axis line VAX.

(Cooling Mechanism)

Since the rod ring portion 160 is in sliding contact with the inner circumferential surface of the rear head 131, frictional heat is generated between the rod ring portion 160 and the inner circumferential surface of the rear head 131. Therefore, cooling techniques to dissipate the frictional heat are preferably incorporated into the compressor 100. With regard to the present embodiment, a feeding device 190 configured to feed a coolant for dissipating the frictional heat (e.g. water) is incorporated into the compressor 100. The feeding device 190 may be a general pump, and may be another device configured to feed the coolant.

As shown in FIG. 1, flow paths 133 are formed in the rear head 131 within the stroke section of the rod ring portion 160. The feeding device 190 is coupled to the flow paths 133 by a pipe member (not shown). The feeding device 190 feeds the coolant to the flow paths 133 through the pipe member. The coolant removes heat from the rear head 131. The coolant after the removal of the heat returns to the feeding device 190 via a predetermined cooling device (not shown). Accordingly, the frictional heat resultant from the friction between the rod ring portion 160 and the inner circumferential surface of the rear head 131 is offset by a low temperature of the coolant, so that an excessive temperature rise does not happen to the rear head 131. Since the cooling effect of the coolant is also given to the rod ring portion 160 through the inner circumferential surface of the rear head 131, an excessive temperature rise does not also happen to the rod ring portion 160. Since the excessive temperature rise of the rear head 131 and the rod ring portion 160 is prevented, there is a reduced risk of thermal deformation of the rear head 131 and the rod ring portion 160. The prevention of the thermal deformation of the rear head 131 and the rod ring portion 160 results in a reduction in a risk of inconvenient phenomena such as a gap between the rear head 131 and the rod ring portion 160, and excessive wear of the rod ring portion 160 excessively strongly pushed against the rear head 131.

With regard to the present embodiment, the feeding device 190, the flow paths 133 formed in the rear head 131, and the cooling device configured to cool the coolant are used as a cooling mechanism for cooling the rear head 131 and the rod ring portion 160. However, the cooling mechanism may be an air blower (not shown) configured to blow air against the outer circumferential surface of the rear head 131 at a position in correspondence to the stroke section of the rod ring portion 160. In this case, a steep temperature gradient is formed between the outer and inner circumferential surfaces of the rear head 131. Therefore, the frictional heat generated on the inner circumferential surface of the rear head 131 is conducted to the outer circumferential surface of the rear head 131, and then is dissipated by airflow from the air blower.

(Techniques to Prevent Backflow Gas by Pressure Difference)

Since the rod ring portion 160 and the rod packing portion 70 divide the internal space of the compressor 100, there is a pressure difference between the spaces divided by the rod ring portion 160 and the rod packing portion 170. A backflow of the gas in the adapter pipe 182 to the variable capacity space 115 is prevented by the pressure difference generated in the compressor 100.

Since the variable capacity space 115 becomes large or small under displacement of the piston 120, a pressure varies for example, in a pressure range from 0.7 MPa to 2 MPa in the space formed by the lower surface of the piston 120, the upper surface of the rear head 131, the cylinder 110 and the outer circumferential surface of and the second rod portion 152. The rod ring portion 160 separates the space surrounded by the outer circumferential surface of the first rod portion 151, the inner circumferential surface of the rear head 131 and the upper surface of the retainer board portion 181 from the variable capacity space 115. Therefore, the pressure variation in the variable capacity space 115 is not transmitted to the space surrounded by the outer circumferential surface of the first rod portion 151, the inner circumferential surface of the rear head 131 and the upper surface of the retainer board portion 181. With regard to the present embodiment, the compressor 100 is designed to maintain a pressure in the space surrounded by the outer circumferential surface of the first rod portion 151, the inner circumferential surface of the rear head 131 and the upper surface of the retainer hoard portion 181 at about 0.7 MPa. The pressure in the space surrounded by the outer circumferential surface of the first rod portion 151, the inner circumferential surface of the rear head 131 and the upper surface of the retainer board portion 181 is lower than the pressure in the variable capacity space 115. Therefore, the gas in the space surrounded by the outer circumferential surface of the first rod portion 151, the inner circumferential surface of the rear head 131 and the upper surface of the retainer board portion 181 does not flow into the variable capacity space 115.

The internal space of the adapter pipe 182 is separated by the rod packing portion 170 from the space surrounded by the outer circumferential surface of the first rod portion 151, the inner circumferential surface of the rear head 131 and the upper surface of the retainer board portion 181. Therefore, a pressure lower than the pressure in the space surrounded by the outer circumferential surface of the first rod portion 151, the inner circumferential surface of the rear head 131 and the upper surface of the retainer board portion 181 is set by the rod packing portion 170. With regard to the present embodiment, an inflow of the purge gas into the adapter pipe 182 is adjusted to maintain the pressure in the internal space of the adapter pipe 182 at about 0.4 MPa. The pressure in the internal space of the adapter pipe 182 is lower than the pressure in the space surrounded by the outer circumferential surface of the first rod portion 151, the inner circumferential surface of the rear head 131 and the upper surface of the retainer board portion 181. Therefore, the purge gas fed into the adapter pipe 182 does not flow into the space surrounded by the outer circumferential surface of the first rod portion 151, the inner circumferential surface of the rear head 131 and the upper surface of the retainer board portion 181.

Second Embodiment

Figure 4:
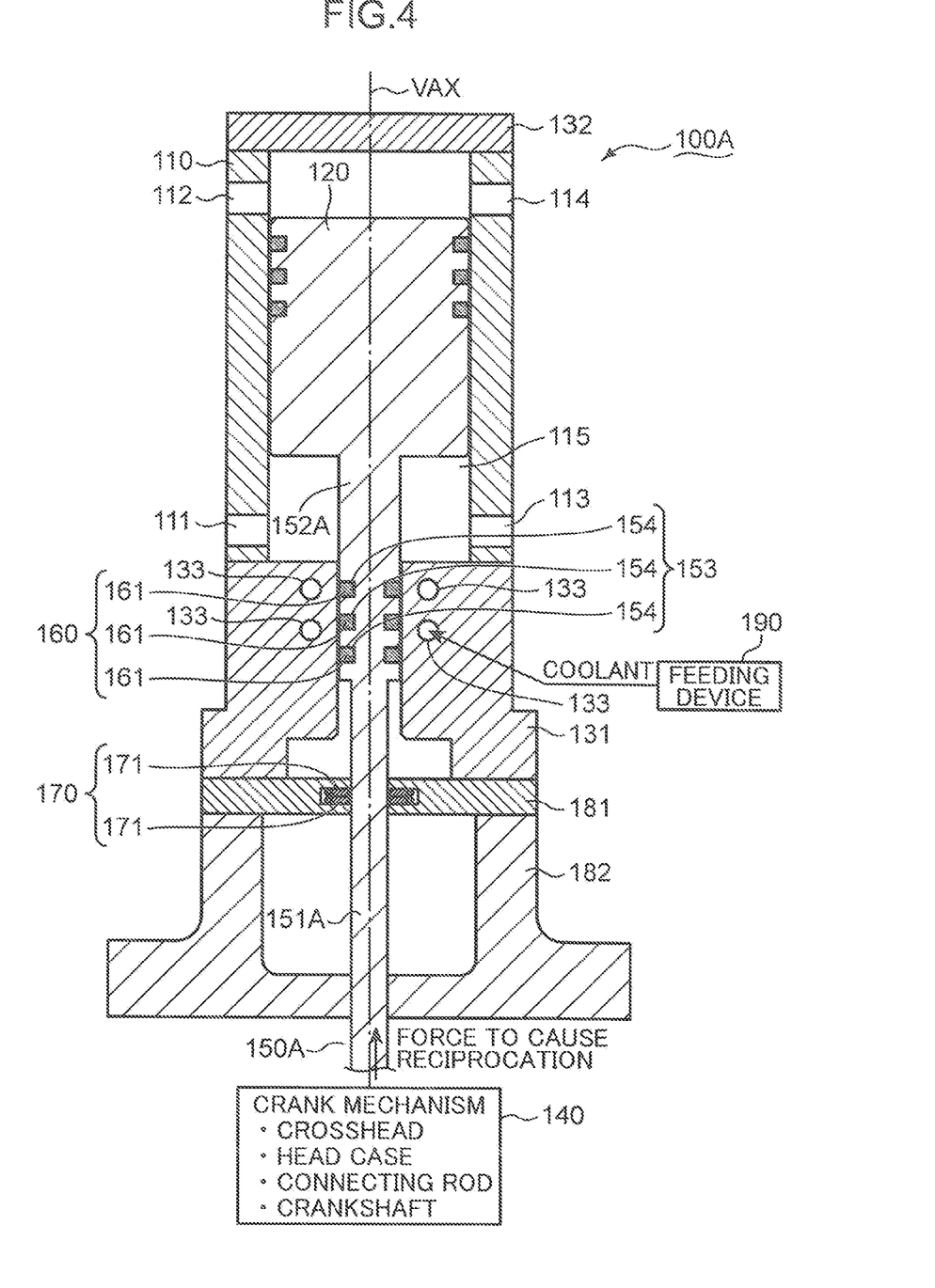
FIG. 4 is a schematic sectional view of a reciprocating compressor of the second embodiment.

FIG. 4 is a schematic sectional view of a reciprocating compressor of the second embodiment (hereinafter referred to as "compressor 100A"). The compressor 100A is described with reference to FIGS. 1 and 4.

The compressor 100A is different from the compressor 100 (c.f. FIG. 1) in a piston rod shape. The compressor 100A is identical to the compressor 100 in other parts. Therefore, description of the first embodiment is applicable to parts other than the piston rod.

The compressor 100A includes a piston rod 150A different in shape from the piston rod 150 of the compressor 100 described in the context of the first embodiment. The first and second rod portions 151, 152 of the piston rod 150 of the first embodiment has the same diameter. On the other hand, the piston rod 150A includes a part in which the groove portion 153 is formed (hereinafter referred to as "second rod portion 152A"), and a first rod portion 151A thinner than the second rod portion 152A. Like the first rod portion 151 of the first embodiment, the first rod portion 151A extends upward from a crosshead of a crank mechanism 140. Like the second rod portion 152 of the first embodiment, the second rod portion 152A extends along the vertical axis line VAX between the first rod portion 151A and the piston 120.

The second rod portion 152A thicker than the first rod portion 151A may have a high mechanical strength even if the groove portion 153 is formed on the outer circumferential surface of the second rod portion 152A. Therefore, intervals of three annular grooves 154 may be short. Alternatively, many annular grooves may be recessed as the groove portion 153 on the outer circumferential surface of the second rod portion 152A.

With regard to the aforementioned embodiments, the variable capacity space 115 is used as a compression chamber for compressing a gas. However, the variable capacity space 115 may not be a compression chamber. For example, a pipe member with a check valve may be coupled to a discharge port 113 and a suction port 111.

With regard to the aforementioned embodiments, the compressor 100 includes the rod packing portion 170. However, the reciprocating compressor does not have to include the rod packing portion 170.

With regard to the aforementioned embodiments, the compressor 100 includes the cooling mechanism (i.e. flow paths 133 and feeding device 190). However, the reciprocating compressor does not have to include the cooling mechanism.

It should be appreciated that the embodiments disclosed this time are in all aspects exemplificative and not restrictive. The scope of the present invention is indicated by the appended claims rather than by the foregoing description, and changes which come within the meaning and scope of the claims and equivalents are therefore intended to be embraced therein.

The aforementioned embodiments mainly include a reciprocating compressor having following configurations.

A reciprocating compressor according to one aspect of the aforementioned embodiments includes a crank mechanism which generates a driving force for reciprocating a piston in a cylinder so that gas flowing into the cylinder is compressed by using the piston reciprocating in the cylinder. The reciprocating compressor includes a piston rod extending along a predetermined central axis across an opening formed in an end of the cylinder, the piston rod being coupled to the piston and the crank mechanism to transmit the driving force from the crank mechanism to the piston; a rear head through which the piston rod extends, the rear head being configured to close the opening of the cylinder; and a rod ring portion configured to prevent the gas in the cylinder from leaking from a gap between the rear head and the piston rod. The piston rod includes an outer circumferential surface on which an annular groove portion is formed to surround the central axis of the piston rod. The rod ring portion includes an inner circumferential portion which is fit into the groove portion; and an outer circumferential portion in sliding contact with an inner circumferential surface of the rear head while the piston rod reciprocates in an extension direction of the central axis together with the piston.

According to the aforementioned configuration, the rod ring portion is used for preventing the gas in the cylinder from leaking from the gap between the rear head and the piston rod. Since the rod ring portion includes the inner circumferential portion which is fit into the groove portion formed on the outer circumferential surface of the piston rod, a gap between the rod ring portion and the piston rod is formed in the groove portion. The gas at high pressure under the reciprocation of the piston in the cylinder enters the boundary in the groove portion and acts to push out the rod ring portion. Accordingly, the outer circumferential portion of the rod ring portion is strongly pushed against the inner circumferential surface of the rear head.

Since the inner circumferential portion of the rod ring portion is fit into the annular groove portion formed on the outer circumferential surface of the piston rod, the rod ring portion reciprocates together with the piston rod while the piston rod reciprocates together with the piston. Meanwhile, the outer circumferential portion of the rod ring portion is in sliding contact with the inner circumferential surface of the rear head. Since the outer circumferential portion of the rod ring is pushed against the inner circumferential surface of the rear head by a strong force as described above, the rod ring portion may prevent the gas in the cylinder from leaking from the gap between the rear head and the piston rod even while the outer circumferential portion of the rod ring portion reciprocating together with the piston rod is in sliding contact with the inner circumferential surface of the rear head. In short, there is a low risk of gas leakage through the boundary between the piston rod and the rear head.

Unlike a conventional rod packing which prevents gas leakage by a force toward the central axis of the piston rod, a contact pressure acting from the outer circumferential portion of the rod ring portion to the inner circumferential surface of the rear head gets stronger in response to an increase in a gas pressure in the cylinder. Therefore, even if the gas pressure in the cylinder is high, the rod ring portion may prevent the gas in the cylinder from leaking from the gap between the rear head and the piston rod. Therefore, the gas leakage from the cylinder is prevented without many rod packings arranged along the piston rod. Since it is not necessary that the reciprocating compressor has a space for arranging many rod packings, the reciprocating compressor may have a small size in the extension direction of the piston rod.

With regard to the aforementioned configuration, the piston rod may include a first rod portion; and a second rod portion extending between the first rod portion and the piston, the second rod portion being identical in diameter to the first rod portion. The groove portion may be formed on the second rod portion.

According to the aforementioned configuration, since the second rod portion on which the groove portion is formed is identical in diameter to the first rod portion, the piston rod may be manufactured easily.

With regard to the aforementioned configuration, the reciprocating compressor may further include an annular rod packing portion including an inner circumferential edge in sliding contact with an outer circumferential surface of the first rod portion of the piston rod reciprocating together with the piston.

Since the rod ring portion is attached to the piston rod, a sliding surface is required on an inner circumferential surface side of the rear head. If too many rod rings are attached as the rod ring portion, the rear head may become long in the axial length direction, so that a structure of the reciprocating compressor may become rather large. According to the aforementioned configuration, the annular rod packing portion having the inner circumferential portion in sliding contact with the outer circumferential surface of the first rod portion is arranged additionally. Therefore, the reciprocating compressor does not become large without the problem of lengthening the axial length of the rear head additionally in order to lengthen the sliding surface on the rear head. In this way, the rod packings may be selected additionally in terms of two viewpoints such as required sealing performance and avoidance of a large size of the reciprocating compressor resultant from arrangement of too many rod rings.

With regard to the aforementioned configuration, the rod ring portion may include rod rings arranged at intervals in the extension direction of the central axis. The groove portion may include annular grooves formed on the outer circumferential surface of the piston rod in correspondence to the rod rings. The rod packing portion may include fewer rod packings than the rod rings, the rod packings being arranged along the first rod portion.

According to the aforementioned configuration, the rod ring portion includes the rod rings arranged at intervals in the extension direction of the piston rod. The groove portion includes the annular grooves formed on the outer circumferential surface of the piston rod in correspondence to the rod rings. Therefore, the rod rings is fit into the annular grooves. Accordingly, the inner circumferential surface of the rear head is in pressure contact with the outer circumferential portion of the rod rings at different positions in the extension direction of the piston rod. Therefore, there is a low risk of gas leakage from the cylinder. Since the rod rings shows high capability for preventing the gas leakage, the rod packing portion may include fewer rod packings than the rod rings.

The fewer rod packings arranged along the first rod portion, which are in sliding contact with die outer circumferential surface of the first rod portion of die piston rod, are not displaced even while the piston rod reciprocates together with the piston. Therefore, the arrangement area in which the fewer rod packings is arranged may be small. In short, the reciprocating compressor may have a small size in the extension direction of the piston rod.

With regard to the aforementioned configuration, the piston may be larger in diameter than the piston rod. The rod ring portion may prevent the gas from leaking from a variable capacity space surrounded by the cylinder, the piston and the rear head to a gap between the piston rod and the rear head.

According to the aforementioned configuration, since the piston is larger in diameter than the piston rod, the variable capacity space surrounded by the cylinder, the piston and the rear head is formed. The variable capacity space becomes larger when the piston moves to the top dead center whereas the variable capacity space becomes smaller when the piston moves to the bottom dead center. The piston moving to the bottom dead center tries to push out the gas inside the variable capacity space into the gap between the outer circumferential surface of the piston rod and the inner circumferential surface of the rear head. However, since the rod ring portion is attached to the piston rod, the rod ring portion prevents the gas from leaking from the variable capacity space to the gap between the outer and inner circumferential surfaces of the piston rod and the rear head.

With regard to the aforementioned configuration, the reciprocating compressor may further include a cooling mechanism configured to cool the inner circumferential surface of the rear head in a stroke section of the rod ring portion reciprocating together with the piston.

Since the rod ring portion is attached to the piston rod reciprocating together with piston as described above, the rod ring portion also reciprocates together with the piston. Meanwhile, frictional heat is generated in the rear head and the rod ring portion since the outer circumferential portion of the rod ring portion is in sliding contact with the inner circumferential surface of the rear head. According to the aforementioned configuration, the reciprocating compressor includes the cooling mechanism configured to cool the inner circumferential surface of the rear head in the stroke section of the rod ring portion reciprocating together with the piston. Therefore, there is not an excessive temperature rise of the rear head and the rod ring portion in the stroke section of the rod ring portion. Accordingly, there is a reduced risk of thermal deformation of the rear head and the rod ring portion. Since the outer circumferential surface of the rod ring portion is in sliding contact with the inner circumferential surface of the rear head without the thermal deformation of the rear head and the rod ring portion, high sealing performance is maintained between the inner circumferential surface of the rear head and the outer circumferential portion of the rod ring portion.

With regard to the aforementioned configuration, the cooling mechanism may include a feeding device which feeds a coolant for cooling the rear head to a flow path formed in the rear head in the stroke section.

According to the aforementioned configuration, since the feeding device feeds the coolant for cooling the rear head to the flow path formed in the rear head in the stroke section, the rear head is cooled by the coolant. Since the outer circumferential portion of the rod ring portion is in contact with the inner circumferential surface of the rear head in the stroke section, the rod ring portion is also indirectly cooled by the coolant. Therefore, there is not an excessive temperature rise of the rear head and the rod ring portion in the stroke section of the rod ring portion.

INDUSTRIAL APPLICABILITY

The aforementioned reciprocating compressor is suitably used for various technical fields in which compressed gas is required.

This application is based on Japanese Patent application No. 2018-015129 filed in Japan Patent Office on Jan. 31, 2018, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A reciprocating compressor including a crank mechanism which generates a driving force for reciprocating a piston in a cylinder so that gas flowing into the cylinder is compressed by using the piston reciprocating in the cylinder, the reciprocating compressor comprising:
   a piston rod extending along a predetermined central axis across an opening formed in an end of the cylinder, the piston rod being coupled to the piston and the crank mechanism to transmit the driving force from the crank mechanism to the piston;
   a rear head through which the piston rod extends, the rear head being configured to close the opening of the cylinder; and
   a rod ring portion configured to prevent the gas in the cylinder from leaking from a gap between the rear head and the piston rod, wherein
   the piston rod includes an outer circumferential surface on which an annular groove portion is formed to surround the central axis of the piston rod,
   the rod ring portion includes:
      an inner circumferential portion which is fit into the groove portion; and
      an outer circumferential portion in sliding contact with an inner circumferential surface of the rear head while the piston rod reciprocates in an extension direction of the central axis together with the piston, and
   the rod ring portion is configured to cause an outward bias force to allow a gas to act outward on the inner circumferential portion of the rod ring portion.

2. The reciprocating compressor according to claim 1, wherein
   the piston rod includes: a first rod portion; and a second rod portion extending between the first rod portion and the piston, the second rod portion being identical in diameter to the first rod portion, and
   the groove portion is formed on the second rod portion.

3. The reciprocating compressor according to claim 2, further comprising
   an annular rod packing portion including an inner circumferential edge in sliding contact with an outer circumferential surface of the first rod portion of the piston rod reciprocating together with the piston.

4. The reciprocating compressor according to claim 3, wherein
   the rod ring portion includes rod rings arranged at intervals in the extension direction of the central axis,
   the groove portion includes annular grooves formed on the outer circumferential surface of the piston rod in correspondence to the rod rings, and
   the rod packing portion includes fewer rod packings than the rod rings, the rod packings being arranged along the first rod portion.

5. The reciprocating compressor according to claim 1, wherein
   the piston is larger in diameter than the piston rod, and the rod ring portion prevents the gas from leaking from a variable capacity space surrounded by the cylinder, the piston and the rear head to a gap between the piston rod and the rear head.

6. The reciprocating compressor according to claim 1, further comprising
a cooling mechanism configured to cool the inner circumferential surface of the rear head in a stroke section of the rod ring portion reciprocating together with the piston.

7. The reciprocating compressor according to claim 6, wherein
the cooling mechanism includes a feeding device which feeds a coolant for cooling the rear head to a flow path formed in the rear head in the stroke section.

* * * * *